3,281,425
ETHERS OF N-METHYLOL-2,2,5,5-TETRAALKYL-
OXAZOLIDINONE-(4)
Wolfgang Seeliger, Marl, Kreis Recklinghausen, Germany, assignor to Chemische Fabrik Kalk G.m.b.H., Cologne-Kalk, Germany
No Drawing. Filed Oct. 28, 1963, Ser. No. 319,516
Claims priority, application Germany, Nov. 2, 1962, C 28,324
3 Claims. (Cl. 260—307)

The present invention relates to novel ethers of N-methylol - 2,2,5,5 - tetraalkyl - 1,3 - oxazolidinone - (4) compounds of the formula

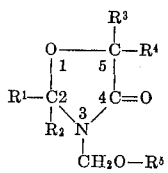

wherein each of $R^1$–$R^4$ is alkyl and $R^5$ is a primary or secondary aliphatic hydrocarbon radical, preferably alkyl or alkenyl containing up to 15 carbon atoms and a method of their preparation.

As is known, alcohols can be converted to ethers under the influence of strong acids, such as, sulfuric acid.

Equilibriums occur in the reaction mixtures which can be expressed in the following equations:

(1)     $ROH + H_2SO_4 \rightleftharpoons RO-SO_3H + H_2O$
(2)     $RO-SO_3H + R'OH \rightleftharpoons R-O-R' + H_2SO_4$ By removal of the ether, R—O—R′, and eventually also the water produced according to Equation 1 from the reaction mixture it is possible to shift the equilibrium in favor of ether formation. Accordingly, the production of an ether according to Equation 2 is rendered considerably more difficult when the ether produced cannot be distilled off under the reaction conditions. This is especially the case when radicals R and R′ are very large and branched.

It is also known that N-methylol compounds of acid amides or lactams easily split off formaldehyde when they are treated with acid. This reaction, which especially occurs at elevated temperatures, can be represented by the following equations:

(3) 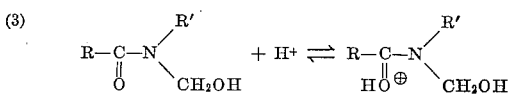

(4) 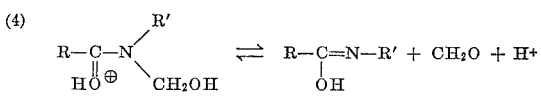

As formaldehyde, in view of its volatility, is immediately removed from the reaction mixture the Equilibriums 3 and 4 are shifted so that they almost completely favor the right side of the equations. As a consequence, it was not to be expected that ethers of N-methylol oxazolidinone-(4) compounds could be prepared analogously to ethers of simple alcohols.

Surprisingly, however, it was found according to the invention that ethers of N - methylol - 2,2,5,5 - tetraalkyl - N - methylol - oxazolidinone - (4) compounds, especially those wherein the alkyl substituents are lower alkyl of 1 to 4 carbon atoms, and primary or secondary alcohols can be produced in the presence of strong acids by heating a mixture of the N - methylol - tetraalkyl substituted oxazolidinone-(4) compound and an alcohol in a molar ratio of 0.1 to 1.0 and a small quantity of a strong acid to temperatures of 40 to 140° C., preferably 50 to 120° C., and subsequently distilling off the excess starting material and then after neutralization of the residue distilling off the desired ether therefrom.

When lower primary or secondary alcohols are employed in the process according to the invention, the ethers produced exhibit very good solvent properties. The ethers obtained with higher alcohols are excellent plasticizers or softeners for plastics, such as, for example, polyvinyl chloride. These plasticizing and softening ethers in addition have the advantage of imparting antistatic properties to the plastics in which they are incorporated.

As indicated above the mixture employed according to the invention for the preparation of the corresponding ethers should contain the N - methylol - oxazolidinone-(4) compound and the alcohol in a molar ratio of 0.1 to 1.0. All primary and secondary alcohols, devoid of competing reactive groups, which are liquid under the reaction conditions can be employed for the formation of the ethers according to the invention. Especially suited are the saturated and unsaturated straight or branch chained aliphatic alcohols containing 1 to about 15 carbon atoms and at least one primary or secondary hydroxyl group. The alcohols can also contain cyclic components bound to the aliphatic portion. Alicyclic alcohols also are suited.

When the ethers according to the invention are prepared in the absence of a solvent, it is advantageous to employ a large alcohol excess. On the other hand, when a solvent is employed as the reaction medium an equimolar quantity of the alcohol or a slight excess thereover suffices. Solvents which are inert with respect to the reactants and easily separable from the reaction mixture, such as, for example, benzene, methyl benzene, ligroin and the like, are suited. Such solvents should also be at least substantially immiscible with water and preferably have a lower boiling point than the alcohol and oxazolidinone reactants.

Only small quantities of catalytic strong acid are required, for example, about 0.1 to 5% by weight with reference to the N-methylol-oxazolidinone-(4) reactant. Examples of such strong acid catalysts, for instance, are: sulfuric acid, oxalic acid, p-toluene sulfonic acid and phosphoric acid.

When the ether formation is carried out in the absence of a solvent, several hours heating of 40 to 140° C., preferably, 50 to 120° C., is required. On the other hand, when a solvent is used and the water formed is distilled off, in some instances together with a portion of the solvent, the heating period required can be reduced to 10–30 minutes. After the heating period required to effect the ether formation, the excess starting substances and, if necessary, the solvent are distilled off and the distillation residue is neutralized with alkaline substances, such as, for example, alkali metal carbonates or hydroxides or alkaline earth metal oxides. The desired ether can then be easily separated from the neutralized mixture by distillation.

The starting N - methylol - 2,2,5,5 - tetraalkyl - 1,3-oxazolidinone-(4) compounds are produced from the corresponding tetraalkyl-oxazolidinone by reaction with an aqueous formalin solution at about 60° C. rendered alkaline with NaOH.

The following examples will serve to illustrate the invention with reference to several embodiments thereof. In such examples the proportions are given in parts by weight.

*Example 1*

A mixture of 43.3 parts of N - methylol - 2,2,5,5 - tetramethyl - 1,3 - oxazolidinone - (4), 79 parts of methanol and 0.5 part of p-toluene sulfonic acid was boiled under reflux of 3½ hours. The residue remaining after the excess methanol was distilled off was neutralized with sodium bicarbonate and distilled under vacuum. 32.6 parts or 70% of theory of N-methoxy methyl - 2,2,5,5-tetramethyl - 1,3 - oxazolidinone - (4) were distilled off at 89–91° C., at a pressure of 10 mm. Hg.

Analysis of such product gave the following values:
Calculated: C, 57.74%; H, 9.15%; N, 7.48%. Found: C, 57.54%; H, 8.98%; N, 7.27%.

*Example 2*

A mixture of 64.8 parts N - methylol - 2,2,5,5 - tetramethyl - 1,3 - oxazolidinone - (4), 58 parts of n-butanol, 87 parts of benzene and 1 part of p-toluene sulfonic acid was boiled in a vessel provided with a reflux condenser and a water trap for about 15 minutes until 8.5 parts of water had been separated off in the trap. The residue remaining after distilling off the benzene and excess butanol was neutralized with sodium bicarbonate and distilled under vacuum. 72.5 parts or 80% of theory of N-butoxy methyl - 2,2,5,5 - tetramethyl - 1,3 - oxazolidinone-(4) were distilled off at 118–119° C. at a pressure of 10 mm. Hg.

The analysis of such product was as follows:
Calculated: C, 64.05%; H, 10.23%; N, 6.23%. Found: C, 63.73%; H, 10.08%; N, 6.27%.

*Example 3*

A mixture of 86.5 parts of N - methylol - 2,2,5,5 - tetramethyl - 1,3 - oxazolidinone - (4), 65 parts of 2 - ethylhexanol, 132 parts of ligroin (B.P. 40–70° C.) and 0.6 part of $H_2SO_4$ was boiled under reflux as in Example 2. The residue remaining after distilling off the solvent and excess alcohol from the reaction mixture was neutralized with CaO and distilled under vacuum. 115.2 parts or 80.5% of theory of N - isooctoxymethyl - 2,2,5,5 - tetramethyl - 1,3 - oxazolidinone - (4) were distilled off at 99–101° C. at a pressure of 0.2 mm. Hg.

The analysis of such product was as follows:
Calculated: C, 67.33%; H, 10.95%; N, 4.91%. Found: C, 67.01%; H, 10.88%; N, 5.04%.

*Example 4*

A mixture of 86.5 parts of N - methylol - 2,2,5,5-tetramethyl - 1,3 - oxazolidinone - (4), 29 parts of allyl alcohol, 158 parts of ligroin (B.P. 40–70° C.) was boiled under reflux as in Example 2. The residue remaining after distilling off the solvent and any remaining alcohol was neutralized with NaOH and distilled under vacuum. 75.5 parts or 71% of theory of N - allyloxymethyl - 2,2,5,5 - tetramethyl - 1,3 - oxazolidinone - (4) were distilled off at 108–109° C. at a pressure of 10 mm. Hg.

The analysis of the product was as follows:
Calculated: C, 61.94%; H, 8.98%; N, 6.57%. Found: C, 61.83%; H, 8.81%; N, 6.72%.

I claim:
1. The compound of the formula

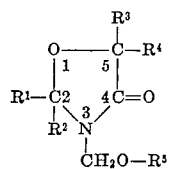

wherein each of $R^1$, $R^2$, $R^3$ and $R^4$ is lower alkyl and $R^5$ is a hydrocarbon radical selected from the group consisting of primary and secondary aliphatic hydrocarbon radicals of 1 to 15 carbon atoms.

2. The compound of the formula

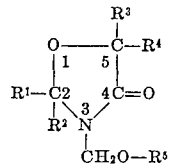

wherein each of $R^1$, $R^2$, $R^3$ and $R^4$ is lower alkyl and $R^5$ is alkyl of up to 15 carbon atoms.

3. The compound of the formula

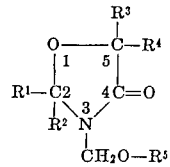

wherein each of $R^1$, $R^2$, $R^3$ and $R^4$ is lower alkyl and $R^5$ is alkenyl of up to 15 carbon atoms.

References Cited by the Examiner

UNITED STATES PATENTS

| | | | |
|---|---|---|---|
| 2,370,839 | 3/1945 | Burke et al. | 260—307.3 |
| 3,188,317 | 6/1965 | Hickner | 260—307.3 |

ALEX MAZEL, *Primary Examiner.*

HENRY R. JILES, *Examiner.*

R. J. GALLAGHER, *Assistant Examiner.*